United States Patent Office 3,290,248
Patented Dec. 6, 1966

3,290,248
SILOXANE ESTER LUBRICANTS
Peter Michael Blanchard, Sunbury-on-Thames, Middlesex, England, assignor to The British Petroleum Company Limited, London, England, a joint-stock corporation of Great Britain
No Drawing. Filed Mar. 3, 1964, Ser. No. 349,136
Claims priority, application Great Britain, Mar. 5, 1963,
8,697/63, 8,698/63
8 Claims. (Cl. 252—49.6)

This invention relates to new complex esters of siloxane dicarboxylic acids having good viscosity/temperature properties and thermal stability and which are useful as thermally stable fluids, synthetic lubricants and hydraulic fluids.

The invention consists in new liquid neutral complex ester products prepared by reacting together under esterification conditions in one or more stages:

(a) A saturated aliphatic monocarboxylic acid having 1–18, preferably 3–10, carbon atoms per molecule, (b) A saturated aliphatic polyhydric alcohol having 5–15 carbon atoms per molecule and preferably having no hydrogen attached to any carbon atom in a 2-position with respect to any hydroxyl group, and (c) An organo siloxane dicarboxylic acid of the formula

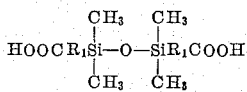

(Formula I)

where the $R_1$'s are alkylene groups, preferably straight chain, having 1–10 carbon atoms.

The word "neutral" as applied to ester products in this specification means a product which is fully esterified or substantially fully esterified.

It is to be understood that more than one of each of the components (a), (b) and (c) may be used in the esterification reaction and, in any case, the reaction product will normally consist of a mixture of different ester molecules.

For most purposes, the relative proportions of reactants (a), (b) and (c) are chosen so as to produce an ester product having a viscosity in the range 2–200, especially 2–10, centistokes at 99° C. (210° F.). Suitable molar ratios of (a):(b) are 1–2.9:1, especially 1.1–2.8:1. The proportion of the other ingredient (c) can be calculated so as to give a carboxyl/hydroxyl balance in the reactants though it may be an advantage to use in the reaction mixture an excess of one or two of the reactants over the stoichiometric proportions in order to accelerate the reaction. The proportions of reactants (a) and (c) will, of course, depend on the number of hydroxyl groups in reactant (b). Thus where (b) is a trihydric alcohol, suitable relative molecular proportions for the reactants (a), (b) and (c) are 2–2.9:1:0.5–0.05, particularly 2.2–2.8:1:0.4–0.1.

The esterification reaction may be carried out in conventional manner, e.g., using a water entrainer (e.g., toluene) and with or without a catalyst. Suitable catalysts are sulphuric acid, p-toluene sulphonic acid, sodium bisulphate, a tetra-alkyl titanate, titanium tetrachloride or a molecular sieve catalyst.

Suitable monocarboxylic acids are caprylic acid, n-heptanoic acid, pelargonic acid and capric acid.

Suitable polyhydric alcohols are 1:1:1-trimethylolpropane, 1:1:1-trimethylolethane, pentaerythritol, neopentyl glycol and 2-methyl-2-n-propyl-1:3-propane diol.

Acids of Formula I may easily be prepared by known methods, e.g., by the well-known malonic ester synthesis reaction using a di(chloroalkyl) disiloxane, followed by hydrolysis to form the tetracarboxylic acid and heating the latter to convert it to the dicarboxylic acid of Formula I.

According to a preferred form of the invention, the liquid neutral complex ester product is produced by reacting:

(a') A saturated aliphatic monocarboxylic acid having 7–10 carbon atoms, (b') 1:1:1-trimethylolpropane, and (c') An acid of Formula I in which the $R_1$'s are straight chain alkylene groups having 2–5 carbon atoms, the relative molecular proportions of (a'):(b'):(c') being 2.2–2.8:1:0.4–0.1.

It has been found that the viscosity index of the neutral complex esters described above may be increased by equilibrating them with a cyclic dimethylsiloxane. Accordingly the invention also include new neutral liquid complex ester products, prepared by equilibrating a complex ester as hereinbefore described with a cyclic dimethylsiloxane containing 2–6 silicon atoms, e.g., octamethyltetrasiloxane. The equilibrating reaction should be carried out in the presence of a catalyst, preferably sulphuric acid.

When it is necessary to distinguish between a complex ester product according to the invention which has been equilibrated with a cyclic dimethylsiloxane from one which has not been so equilibrated, the former will hereinafter be called an "equilibrated complex ester" and the latter an "unequilibrated complex ester." The term "complex ester" by itself includes both types.

During the equilibrating reaction, the cyclic siloxane reacts with the structure.

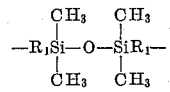

present in some of the molecules of the complex ester product of the esterification reaction to form a structure

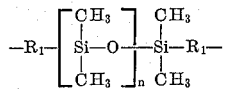

where $n$ is an integer. The amount of cyclic siloxane used will depend to an important extent on the viscosity characteristics desired in the final product. It has been found that when one mole of octamethyltetrasiloxane is used per mole of Formula I acid reacted in the first stage of the reaction, the final complex ester product has, surprisingly, viscosity/temperature properties which are outstandingly better than those of the unequilibrated complex ester product. With smaller amounts of octamethyltetrasiloxane the improvement in this respect is proportionately less and with greater amounts a more viscous oil will result. For most purposes a molar amount of the cyclic siloxane which is between 0.25 and 4 times the molar amount of Formula I acid reacted in the first stage will be suitable.

It is to be understood that the invention also includes blends of two or more of the liquid neutral complex ester products, both equilibrated and unequilibrated, previously described.

According to a further feature, the invention also includes blends of one or more of the said liquid neutral complex ester products with one or more simple neutral esters prepared by reacting ingredients (a) and (b), especially (a') and (b'), the proportion of the said liquid complex ester product in the blend being at least 25%, preferably at least 50%, by weight of the blend.

The use of blends as described in the two preceding paragraphs facilitates the production of a final product of a given viscosity.

The invention also includes a method of making a liquid neutral complex ester product in which reactants (a), (b) and (c) are reacted together under esterification conditions in one or more stages, followed by equilibration if desired.

Three neutral complex ester products according to the invention will now be described by way of example. Two of these, hereinafter identified as Esters P1 and P2, are unequilibrated products and the third, hereinafter identified as Ester A, is an equilibrated product.

*Preparation of Esters P1 and P2*

Ester P1 was prepared from the following ingredients:

Caprylic acid _____ 28.8 g. (0.2 mole).
1:1:1-trimethylolpropane _____ 10.72 g. (0.08 mole).
Formula I acid where $R_1$=trimethylene _____ 6.12 g. (0.02 mole).

The components were refluxed with toluene as water entrainer and 0.05 g. tetrabutyl titanate as catalyst for 72 hours when the theoretical amount of water was collected. The toluene was distilled off and the product stripped of light ends to 220° C. at 1 mm. mercury.

Ester P2 was prepared from the same ingredients and by the same method except that no catalyst was used.

*Preparation of Ester A*

Ester A was prepared by equilibrating Ester P2.

0.75 ml. of 98% sulphuric acid was added with stirring to Ester P2. 2.25 g. (0.02 mole) of octamethyltetrasiloxane were added afterwards. The mixture was stirred for 2 hours at room temperature and stood overnight. The solution was taken up in 40/60 petroleum ether and washed free of acid and then stripped to 200° C. at 0.2 mm. mercury.

The properties of Esters A, P1 and P2 are given in the following table.

|  | Ester A | Ester P1 | Ester P2 |
|---|---|---|---|
| Kinematic at 99° C. (210° F.) | 7.38 | 7.25 | 7.23 |
| Viscosity at 38° C. (100° F.) | 37.6 | 43.0 | 42.8 |
| (Centistokes) at −40° C. (−40° F.) | 9,540 | 17,700 | 17,670 |
| Viscosity Index | 142 | 135 | 135 |
| ASTM slope (210° F. to −40° F.) | 0.642 | 0.660 | 0.661 |
| Pour Point ° F | −65 | −65 | −60 |
| Flash Point, ° F |  | 500 | 500 |

We claim:

1. A liquid complex ester product prepared by reacting together under esterification conditions in at least one stage:
   (a) a monocarboxylic alkanoic acid having 7–10 carbon atoms per molecule,
   (b) 1:1:1-trimethylolpropane, and
   (c) an organo siloxane dicarboxylic acid of the formula $$\text{HOOCR}_1\underset{\underset{\text{CH}_3}{|}}{\overset{\overset{\text{CH}_3}{|}}{\text{Si}}}-\text{O}-\underset{\underset{\text{CH}_3}{|}}{\overset{\overset{\text{CH}_3}{|}}{\text{Si}}}\text{R}_1\text{COOH}$$

in which the $R_1$'s are straight chain alkylene groups having 2–5 carbon atoms, the relative molecular proportions of (a):(b):(c) being 2.2–2.8:1:0.4–0.1.

2. An ester product according to claim 1 in which the monocarboxylic acid is selected from the group consisting of:
caprylic acid, n-heptanoic acid, pelargonic acid, capric acid and mixtures thereof.

3. An ester product in which the complex ester product of claim 1 is reacted with a cyclic dimethyl siloxane in 0.25–4 molecular proportions of the cyclic siloxane for each molecular proportion of dibasic acid used in the preparation of the complex ester product.

4. An ester product according to claim 3, in which the cyclic siloxane is octamethyltetrasiloxane.

5. A lubricating oil composition which consists essentially of a blend of at least 25% by weight of liquid neutral complex ester products according to claim 1 and at least one simple neutral ester prepared by reacting together a monocarboxylic alkanoic acid having 7–10 carbon atoms and 1:1:1-trimethylolpropane.

6. A lubricating oil composition according to claim 5 which contains at least 50% by weight of the complex ester product.

7. A lubricating oil composition which consists essentially of a blend of at least 25% by weight of liquid neutral complex ester products prepared by reacting a complex ester product in accordance with claim 3 with a cyclic dimethylsiloxane which contains 2–6 silicon atoms per molecule, and at least one simple neutral ester prepared by reacting together a monocarboxylic alkanoic acid having 7–10 carbon atoms and 1:1:1-trimethylolpropane.

8. A lubricating oil composition according to claim 7 which contains at least 50% by weight of the complex ester product.

References Cited by the Examiner

UNITED STATES PATENTS

| 2,469,888 | 5/1949 | Patnode | 260—448.2 |
| 2,916,507 | 12/1959 | Kirschner et al. | 252—49.6 X |
| 2,951,861 | 9/1960 | Kirschner et al. | 252—49.6 X |
| 2,966,508 | 12/1960 | Kirschner et al. | 252—49.6 X |
| 3,048,608 | 8/1962 | Girard et al. | 252—56 |
| 3,048,623 | 8/1962 | Matuszak et al. | 252—56 X |
| 3,090,753 | 5/1963 | Matuszak et al. | 252—52 X |

DANIEL E. WYMAN, *Primary Examiner.*

P. P. GARVIN, *Assistant Examiner.*

UNITED STATES PATENT OFFICE
CERTIFICATE OF CORRECTION

Patent No. 3,290,248                         December 6, 1966

Peter Michael Blanchard

It is hereby certified that error appears in the above numbered patent requiring correction and that the said Letters Patent should read as corrected below.

Column 2, line 8, for "(b′) 1:1-trimethylolpropane" read -- (b′) 1:1:1-trimethylolpropane --.

Signed and sealed this 19th day of September 1967.

(SEAL)
Attest:

ERNEST W. SWIDER                        EDWARD J. BRENNEI
Attesting Officer                          Commissioner of Patents